No. 712,411. Patented Oct. 28, 1902.
F. H. RICHARDS.
GOLF BALL.
(Application filed Apr. 24, 1902.)

(No Model.)

Witnesses:
Ralph Lancaster
Fred C. Maynard

Inventor:
F. H. Richards

UNITED STATES PATENT OFFICE.

FRANCIS H. RICHARDS, OF HARTFORD, CONNECTICUT, ASSIGNOR TO THE KEMPSHALL MANUFACTURING COMPANY, OF ARLINGTON, NEW JERSEY, A CORPORATION OF NEW JERSEY.

GOLF-BALL.

SPECIFICATION forming part of Letters Patent No. 712,411, dated October 28, 1902.

Application filed April 24, 1902. Serial No. 104,509. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Golf-Balls, of which the following is a specification.

This invention relates to playing-balls; and its object is to produce at low cost a strong ball having flying and other properties specially adapting it for use in golf and similar games.

Figure 1:
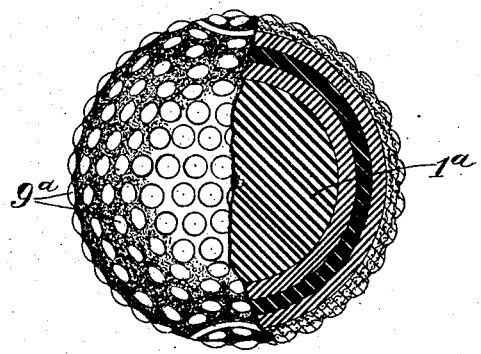
Figure 2:
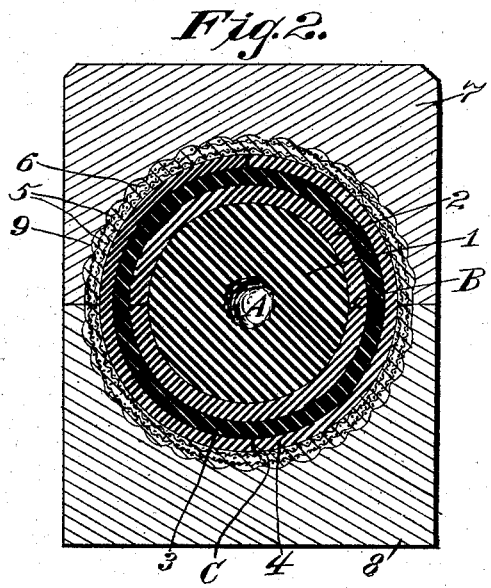

In the accompanying drawings, Figure 1 is a part-sectional view of a ball made in accordance with my present improvements, and Fig. 2 is a sectional view showing the components of the ball assembled in a mold.

In said views like parts are designated by similar characters of reference.

One feature of my present improvements relates to the construction of the ball with an outer layer cushioned upon a spring layer or spring-shell, this shell being again cushioned by a relatively thin layer upon a firm but slightly-yielding central portion or core, and a further feature consists in the integrality of the said spring-shell with one or both of said cushion layers, (one such layer being outside and the other inside of said spring-shell,) this integrality being accomplished in the case of a ball in which said parts are made of rubber by so uniting together the several layers in the process of manufacture that the said layers are united the one to the other throughout substantially their entire areas. When thus built up, the said composite shell for supporting the outer covering and itself supported upon the inner core of the ball consists of a central highly-resilient layer, which is assisted and is also protected by a relatively soft layer on either side thereof. When the outer portion of the ball is made entirely of rubber, thus including the outer covering, (which may of course have fabric embedded therein for limiting the extensibility thereof circumferentially of the ball,) said outer layer is preferably united in a similar manner, as above indicated, to the said composite spring-shell, by which means the transmission of the forces when the ball is struck is better distributed upon the corresponding area of said spring-shell, by which means the spring-shell may be made thinner as well as of harder material, and thus more highly elastic, than would otherwise be deemed desirable. When the core of the ball is made of rubber vulcanized to a consistency somewhat greater than that of the said cushion layer, this core by reason of its own mobility will operate in connection with the other parts to somewhat modify the action of each of them, as well as to modify their action as a combination, and by this means, in connection with a suitable proportioning of the various parts in view of the particular work to be accomplished by the use of the ball, the ball may be given varying degrees of resistance and also varying degrees of liveliness, as may be desired.

For the core of the ball I preferably employ a sphere 1 of uncured or partially-cured rubber, said core or sphere having a central cavity A. Over this I place a layer 2, of uncured or partially-cured soft rubber, preferably in the form of segments, the joint between which is indicated at B. Upon the layer 2 I apply a layer 3, of hard rubber, such as used in making hard-rubber goods of commerce. Upon this hard-rubber layer I apply segments 4, of soft springy rubber, the joint between them being indicated at C, and over the whole I place a cover consisting of one or more layers (preferably two) of fabric 5, incorporated with a layer of rubber 6, which is preferably strong and able to sustain rough usage without cracking or chipping.

The several elements of the ball thus assembled I place in a mold consisting of cups 7 and 8, each cup being preferably provided with pits 9 for forming brambles upon the ball, and then I heat the mold and ball to an extent to cure more thoroughly all of the rubber components of the ball, the curing proceeding far enough to produce a ball having the required characteristics. In curing the several elements each is welded to its mate, while all of the components of the ball are welded together, thus forming a solid and strong ball. The expansion of the material of the ball due to the said curing causes the sides of the cavity A of the core or center piece to contract, thus making said core or center piece practically solid, as indicated at 1ª, Fig. 1, the principal purpose in providing said cavity A being to permit such expansion of the material. By having the several components of the ball originally cured to a certain extent the liability of the sulfur from one layer passing through other layers is reduced, so that each layer may substantially preserve its integrity and characteristics, as indicated at Fig. 1.

The hard-rubber shell 3 gives a very quick response when the ball is tended to be distorted by a blow from a club, and by both facing and backing it with the highly-resilient soft-rubber layers 4 and 2 this quality of the hard-rubber layer is well developed, while said soft-rubber layers also prevent sharp indentation and cracking of the said hard-rubber layer. The center piece 1, which preferably forms a large portion of the body of the ball, may be of a very firm quality of rubber and such as will quickly recover itself from a blow, but preferably not of such a soft character as the layer 2, which backs the hard-rubber layer 3. The outer portion of the ball should be of a tough quality of rubber— such as used, for instance, in forming leather belting and other articles which are subjected to rough usage. The fabric 6 in said outer layer or casing tends to strengthen the latter and, moreover, prevents the ball from being too sensitive when given a light blow by a club, so that it is well adapted for "putting." By being cured upon the inner portion of the ball said casing is rendered proof against disruption from the latter, which is a very important feature in this class of balls. By providing the mold with the pits 9 brambles 9ª, Fig. 1, are caused to be formed upon the facing as the ball is cured. Thus I produce a ball which is unaffected by the heat of a summer's day and is phenomenally tough and durable and has such extraordinary flying power as to render it suitable for the game of golf, while, as will be observed, it may be produced at low cost.

Variations may be resorted to within the scope of my improvements.

It will be understood that owing to the expansion of the material within the confines of the mold the core 1 and the soft-rubber layer thereupon are both put into a state of permanent compression, so that they tend constantly to expand the hard-rubber shell 3 and the overlying shell components, or, in other words, the compound shell of the ball holds the filling in a state of normal compression.

Having thus described my invention, I claim—

1. A ball comprising a firm core, a layer of soft rubber thereon, a layer of hard rubber upon said soft rubber, a layer of soft rubber upon said hard rubber, and a casing of tough rubber in which fabric is embedded.

2. A ball comprising a firm core, a layer of soft rubber thereon, a layer of hard rubber upon said soft rubber, a layer of soft rubber upon said hard rubber, and a casing of tough rubber in which fabric is embedded; all of said rubber elements being vulcanized together.

3. A ball comprising a firm rubber core, a layer of soft rubber thereon, a layer of hard rubber upon said soft rubber, a layer of soft rubber upon said hard rubber, and a casing of tough rubber in which fabric is embedded; all of said rubber elements being vulcanized together.

4. A playing-ball comprising a relatively thin shell of hard rubber backed by yielding rubber and also faced by yielding rubber.

5. A playing-ball comprising a relatively thin shell of hard rubber backed by yielding rubber and also faced by yielding rubber; said facing being protected by a casing of rubber compounded with fabric.

6. In a playing-ball, a sphere of hard rubber backed by a sphere of soft rubber, said spheres being vulcanized together.

7. A playing-ball comprising a core of firm material, a soft-rubber layer thereon, a hard-rubber layer upon said soft-rubber layer, a soft-rubber layer upon said hard-rubber layer, and a harder casing consisting of fabric and plastic material.

8. In a playing-ball, a shell comprising a layer of hard rubber and a layer of tough material thereon, and a filling within said hard-rubber layer; said filling consisting at least partially of soft rubber and being held under compression by said shell.

9. A playing-ball comprising a core of firm rubber, a shell of firm rubber, and an intermediate layer of rubber softer than said core and shell.

10. A playing-ball comprising a core of firm rubber, a shell of firm rubber, and an intermediate layer of rubber softer than said core and shell; said shell confining said core and intermediate layer in a state of compression.

11. A playing-ball comprising an interior body consisting of rubber, at least a portion whereof is in the form of a soft sphere, and an exterior shell confining said body in a state of compression; said shell consisting at least partially of firm rubber.

12. A playing-ball comprising an interior body of rubber at least a portion whereof is in the form of a sphere of soft rubber, and an outer shell consisting of firm rubber incorporated with fabric.

13. A playing-ball comprising an interior body of rubber at least a portion whereof is in the form of a sphere of soft rubber, and an outer shell vulcanized thereto and consisting of firm rubber incorporated with fabric.

FRANCIS H. RICHARDS.

Witnesses:
B. C. STICKNEY,
EDWARD E. ELLIS.